May 29, 1934.  H. H. WELCH  1,960,400
MEANS FOR INDICATING LIQUID LEVELS
Filed May 26, 1926
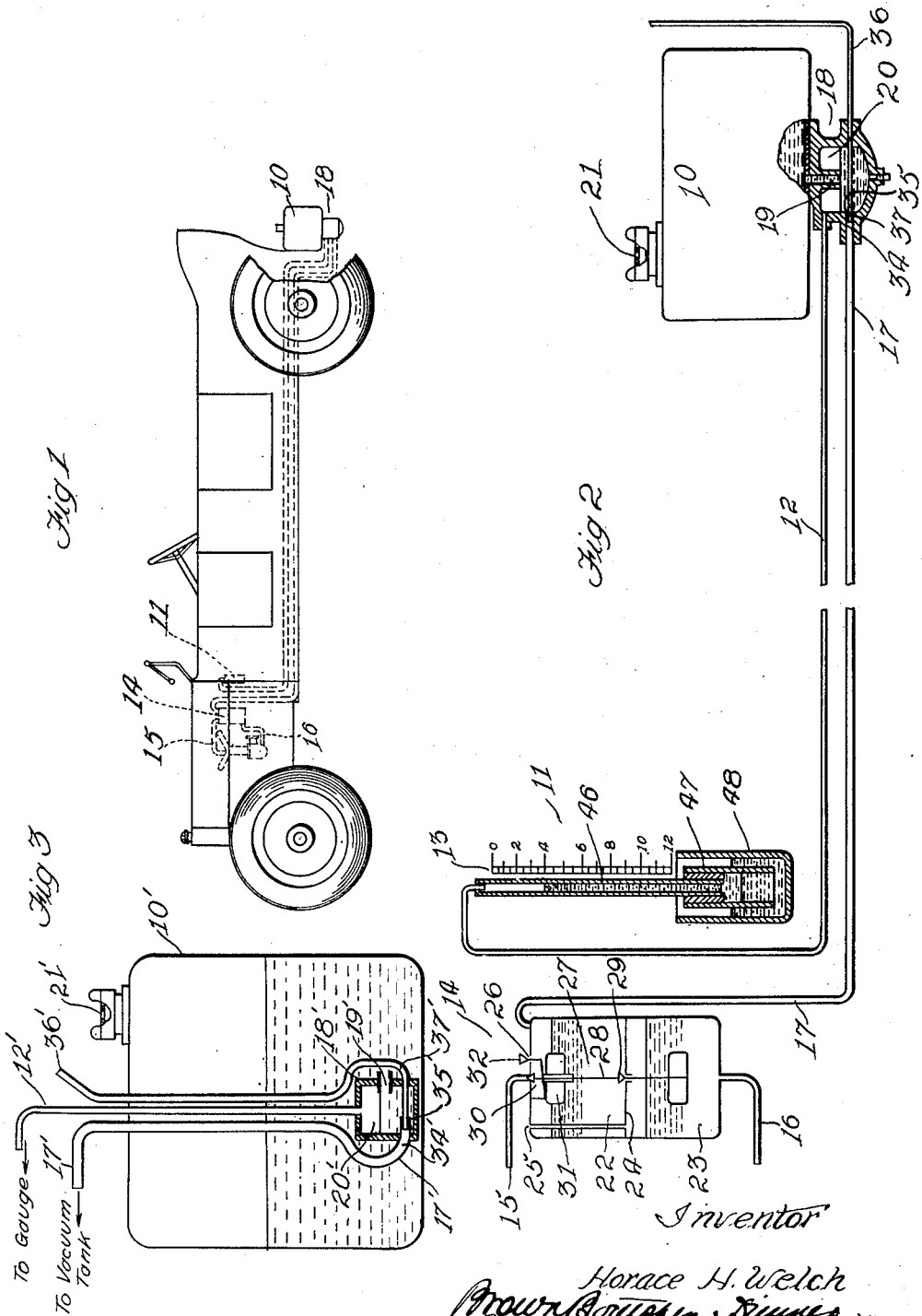

Patented May 29, 1934

1,960,400

UNITED STATES PATENT OFFICE 1,960,400

MEANS FOR INDICATING LIQUID LEVELS

Horace H. Welch, New York, N. Y., assignor to Bendix Stromberg Carburetor Company, Chicago, Ill., a corporation of Illinois Application May 26, 1926, Serial No. 111,685

3 Claims. (Cl. 73—54)

My invention relates to indicators for indicating at a remote point the level of liquid in the supply reservoir, or the like. A specific embodiment of the invention is disclosed in the accompanying drawing and detailed description as comprising an indicating system for indicating on the instrument board of an automobile the level of liquid fuel in the supply tank. The present application is a continuation in part of my prior co-pending application Serial No. 275,506, filed February 7, 1919.

The invention claimed in the present application relates to a specific form, first disclosed and broadly claimed in said parent application.

Now, in order to acquaint those skilled in the art with the manner of constructing and operating a device embodying my invention, I shall describe in connection with the accompanying drawing a particular embodiment of the same.

In the drawing:—

Figure 1 is a side elevation of an automobile provided with a liquid level indicating system for indicating the quantity of fuel in the fuel tank, said system being made in accordance with my invention;

Fig. 2 is a diagrammatic view illustrating an indicating system embodying my invention and such as is suitable for application to an automobile; and Fig. 3 is a diagram of a modification of Fig. 2 illustrative of the operation of the device shown in Figures 1 and 2.

In said drawing 10 represents the storage tank or reservoir containing, in the case of an automobile, the liquid fuel the quantity of which it is desired to indicate. I provide an indicator 11 which is adapted to be placed upon the dash board of the automobile, and I connect the indicator 11 to the lower part of the tank 10 by a tube or pipe 12, so that the static pressure or the depth of liquid in the tank 10 can be transmitted to the indicator to indicate the depth or quantity of liquid. I provide a scale 13, in conjunction with the indicator, which is arranged to indicate preferably the gallons of fuel in a tank of known size, the gallons being proportionate to the depth or pressure.

As is usual in vacuum feed systems for the fuel of automobiles, a small elevated liquid fuel reservoir 14 is provided, connected to the intake of the engine by a draft tube 15, to the carbureter by a feed pipe 16, and to the lower part of the storage tank 10 by a pipe 17.

Referring particularly to Figure 2, I provide the storage tank 10 with a sump or trap 18 on its bottom, into which the liquid fuel from the tank 10 flows by gravity. I connect the sump 18 with the interior of the tank by a feed pipe 19 through which the gasoline in the tank freely flows to the sump. The upper end of the pipe 19 is flush with the floor of the tank and the pipe 19 projects down into the sump 18, toward the bottom thereof, ending at a point above the bottom of the sump. The sump, with the pipe 19, thus forms a trap into which the liquid freely flows from the tank 10 and traps the air in the upper part 20 of the sump, above the lower end of the pipe 19, and compresses the air thus caught in the upper part of the trap.

I connect the indicator pipe 12 to the sump 18 at the top of the air space 20 thus formed, and thus prevent the entrance of any liquid into the pipe 12. The pressure produced in the air space by the head of liquid in the fuel tank is carried through the connecting pipe 12 and caused to operate the indicator 11 to indicate, upon the dash board of the automobile, the level of the liquid in the tank or its quantity. Due allowance, of course, must be made for the difference in height between the bottom of the tank and the lower end of the pipe 19, as this height adds pressure without adding any appreciable volume of fuel, but this allowance once being made by the arrangement of the indicator scale, with reference to the indicator, it does not have to be thereafter taken into consideration, as it is constant.

As any variation in the height of the liquid in the trap 18 will effect a corresponding variation in the indication of the quantity of liquid in the tank 10, I provide means for maintaining the liquid level in the trap 18, at a certain definite point, which is at the level of the lower end or mouth of the pipe 19.

My method of constantly maintaining the indicating system in proper condition for accurate indications is to make use of the ordinary vacuum fuel feed system, to force, carry, or inject a small quantity, or a few bubbles of fresh air into the trap 18 each time the vacuum system operates, to draw fuel from the storage tank into the vacuum feed tank. The air thus brought into the trap 18 rises through the liquid therein into the upper part thereof and, if the liquid in the trap 18 is above the lower end or mouth of the pipe 19, the liquid is forced down by this addition of air until it stands even with the mouth of the pipe 19, after which any further addition of air will cause some of the gaseous fluid which fills the air trap to escape up through the pipe 19 and through the liquid in the tank 10, the tank 10 being provided with an air vent 21 for affording free escape to the atmosphere.

While the structural means for causing the operation of the vacuum fuel feed to add air to the indicating system may take different forms, they all include some means for causing air to be carried into the trap 18 upon each intermittent operation of the fuel feed system. In the vacuum feed system which I employ in connection with my indicating system, I provide the vacuum feed reservoir 14, which I arrange as follows: I divide the reservoir into an upper compartment 22 and a lower compartment 23, separated by a horizontal partition 24.

The pipe 16 enters the bottom of the lower compartment and the pipe 17 enters the top of the upper compartment. The pipe 15 connects with the intake manifold of the engine and also enters the upper compartment. I provide a vent 25 for the lower compartment, and a vent 26 for the upper compartment. The upper compartment is the pump chamber and the lower compartment is a supply chamber for the carbureter. I control the operation of the feed system by a float device 27 comprising a vertical valve rod 28 having a valve 29 for closing off communication between the chambers upon a downward movement of the valve rod, and a valve 30 at its upper end for closing off communication with the pipe 15 upon an upward movement of the valve rod. The rod is controlled by a float 31 in the upper chamber, which rises and falls according to the height of liquid in the upper chamber. I also provide a valve 32, controlled by the valve rod 29, and arranged to open the vent 26 when the valve 30 closes, and close the vent when the valve 30 opens. In the operation of this fuel feed system, the valve 29, being open, the valve 30 closed, and the vent 26 open, the liquid flows down into the lower compartment from the upper compartment to replace the liquid taken from the lower compartment by the carbureter. This continues until the float 31 in the upper chamber sinks far enough to change the valves, viz., to close the valve 29 and open the valve 30 and close the vent 26, at which time the upper chamber is closed except that it communicates with the sump 18 through the pipe 17, and with the intake manifold of the engine, and the vacuum which is induced in the upper chamber operates to draw liquid from the sump 18 through the pipe 17 into the chamber 22. When sufficient fuel is thus pumped into the chamber 22 to lift the float 31 high enough, it again reverses the several valves, thus opening communication to the lower tank, and cutting off the vacuum connection, and opening the upper chamber to the air. As I connect the pipe 17 directly to the upper chamber without a valve, this action permits the liquid remaining in the pipe 17 to sink or flow back to the sump 18.

It will now be understood that the vacuum feed system operates intermittently to draw fuel from the tank 10 to the auxiliary reservoir 14.

To cause this intermittent operation of the vacuum system to maintain the indicating system in accurate indicating condition, I provide means for causing the return of the liquid in the pipe 17, at the cessation of the intermittent operation, to force or carry air into the trap 18, which may be more or less, but is at all times sufficient to maintain the air trap 20 free from liquid and the liquid level in the trap 18 depressed to the level of the mouth of the pipe 19.

The means which I employ for this purpose, as illustrated in Figure 2, consists of a small chamber 34 in communication with the trap 18 below the liquid level thereof, through a restricted passage 35, and I enter the vacuum feed pipe 17 into this small chamber. I provide the restricted passage 35 by means of an air pipe 36, the delivery end 37 of which I enter into the chamber 34, through the passage 35, and by this means I choke or reduce the passage 35 to such an extent that when the vacuum feed system operates to draw fuel from the tank, I induce or produce a pressure in the chamber 34, enough below atmosphere to draw out the liquid which may have risen in the pipe 36, and thereafter draw air through the said pipe 36, the pipe 36 being carried above the extreme upper liquid level of tank 10.

The air thus drawn into the chamber 34 is entrapped into the liquid being drawn into the pipe 17 through the restricted passage 35, and is carried in the form of separated bubbles along the pipe 17 and into the tank 14. At the end of the intermittent action of the vacuum feed system, and when the vent 26 opens, the liquid in the pipe 17, together with the bubbles of air entrapped therein, sinks back into the trap 18 and the air thus carried into the trap rises into the upper part thereof, causing the level of liquid therein to sink to the level of the mouth of the pipe 19 and to be maintained at this point, at such time the air pipe 36 is sealed by the liquid in the trap 18.

In order to show this action more clearly, I have added the diagram of Figure 3 which shows a modified and simplified form of the device and in which the parts all have similar reference numerals primed. In this case the trap 18' is shown as disposed in the liquid in the tank 10', and the tubes 17', 12' and 36' extend down through the top of the tank 10' to the lower part thereof. The chamber 18' communicates with the liquid in the tank 10' through the pipe 19' which determines the datum level in said chamber 18'. When the air in the air space 20' is increased, tending to bring the datum level below the upper side of the pipe 19', air will pass out into the main tank 10 and out through the vent 21' in the filler cap.

When the vacuum tank draws a charge of liquid fuel through the pipe 17', it puts suction upon the chamber 34' drawing down the column of liquid which stands in the pipe 36' and then drawing atmosphere into the liquid which discharges from the bottom of the chamber 18' into said pipe 17'. The pipe 19' is of relatively unrestricted size with respect to the restricted passageway 35', so that the pressure balance between the liquid in the tank and the air in the air space 20' is not disturbed by the drawing of liquid by the vacuum tank. Upon the resurgence of the column of liquid in the pipe 17' which leads up to the vacuum tank, the mixture of air and liquid is discharged back into the liquid space below the air space 20', the air separating out and rising to the top, and the liquid passing out through the pipe 19'. Any excess of air which would tend to depress the datum level below the upper side of the pipe 19' will be discharged out into the tank 10' and pass out the vent 21'.

In the operation of my system, the air or gas line, comprising the air chamber 20 and the connecting pipe 12, is automatically maintained full of gaseous fluid and in proper working condition by air supplied through the intermittent operation of the vacuum fuel system.

I provide a very simple means for testing the indicating system to discover if it is properly indicating the level of liquid. This consists simply in blowing air into the trap 18 through the air admission pipe until the air begins to bubble up through the tank 10. This can be readily accomplished by applying the mouth directly to the open end of the air pipe, as the pressure to be overcome is but a few ounces. In any event, no harm can result from an over supply of air as it will merely rise through the pipe 19 and bubble up through the liquid in the tank 10. Another advantage which accrues through the use of my means of admitting air to the draft pipe 17, at its lower end, is that the liquid raised to the tank 14 through said pipe is intermingled with air and thus the weight to be raised by the vacuum is decreased, as the column of liquid will not consist entirely of liquid, but of quantities of liquid separated by quantities of air. Thus the column in the pipe 17 will be reduced in weight and the liquid can be raised by a vacuum of less strength or it can be raised higher by the same vacuum, either of which advantages are of value, particularly when driving an automobile up a long hill where the ordinary relative levels are greatly disturbed.

I do not intend to be limited to the details shown and described.

I claim:—

1. In a device of the class described, a tank for liquid the depth of which is to be measured, a pressure chamber communicating with the liquid at the full depth to be measured and comprising an air trap, an intermittently operating vacuum tank for drawing liquid from the tank to a higher level, a draft tube from the vacuum tank communicating directly with the bottom of the chamber and communicating with the liquid in the tank, a pressure operated indicator connected to the top of the air trap, and a tube having its lower end liquid sealed by the liquid in the bottom of the pressure chamber and having its upper end communicating with atmosphere above the normal level of the liquid in the tank, air being drawn in through the tube upon operation of the vacuum tank.

2. In an automobile, a liquid fuel reservoir at a lower level than the instrument board, a liquid level indicator on the instrument board, an auxiliary vacuum fuel feed tank for the engine of the automobile, a trap at the bottom of the reservoir, an air line connecting the top of the trap with the indicator, a draft pipe connecting the auxiliary tank with the trap, an air inlet pipe entering said trap and through which air inlet pipe air is adapted to be drawn into the draft pipe when the vacuum feed system operates to draw liquid from the tank, and means associated with the vacuum tank for admitting air to the draft pipe at its upper end upon a cessation of the vacuum to permit the return by gravity of liquid containing air through the draft pipe to discharge air into the trap.

3. The herein described liquid level indicating apparatus for indicating the quantity of liquid fuel in the storage tank of an automobile having a vacuum fuel feed system, said storage tank being open to atmosphere, a fuel feed tank, an indicator on the dash of the automobile, an air trap at the bottom of the fuel storage tank to which the vacuum feed system is connected, a liquid draft pipe in which the vacuum feed system is adapted to produce a pressure below atmosphere providing said connection, an air pipe leading into the trap through which air pipe air is adapted to enter the trap by the operation of the vacuum feed system, and a pressure pipe connecting the upper part of the trap with the indicator.

HORACE H. WELCH.